(12) United States Patent
Ko et al.

(10) Patent No.: US 8,980,149 B2
(45) Date of Patent: Mar. 17, 2015

(54) METHOD AND DEVICE FOR MANUFACTURING ARTIFICIAL STONE

(75) Inventors: Hae-Seung Ko, Cheongju-si (KR); Chang-Hwan Park, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 339 days.

(21) Appl. No.: 13/393,901

(22) PCT Filed: Dec. 23, 2010

(86) PCT No.: PCT/KR2010/009241
§ 371 (c)(1),
(2), (4) Date: Mar. 2, 2012

(87) PCT Pub. No.: WO2011/090268
PCT Pub. Date: Jul. 28, 2011

(65) Prior Publication Data
US 2012/0153526 A1  Jun. 21, 2012

(30) Foreign Application Priority Data
Jan. 21, 2010  (KR) .................. 10-2010-0005523

(51) Int. Cl.
*B28B 5/04*  (2006.01)
*B29C 67/24*  (2006.01)
*B28B 1/08*  (2006.01)

(52) U.S. Cl.
CPC ............... *B29C 67/243* (2013.01); *B28B 1/082* (2013.01)
USPC ............. 264/109; 264/122; 264/128; 264/73

(58) Field of Classification Search
USPC .................................. 264/109, 122, 128, 73
See application file for complete search history.

(56) References Cited

U.S. PATENT DOCUMENTS

| 5,280,051 A * | 1/1994 | Traverso et al. .............. 523/171 |
| 2005/0106336 A1* | 5/2005 | Ong et al. ...................... 428/15 |
| 2007/0244222 A1 | 10/2007 | Ghahary et al. |

FOREIGN PATENT DOCUMENTS

| CN | 101337805 A | 1/2009 |
| EP | 0492555 A1 | 7/1992 |
| EP | 1266734 A2 | 12/2002 |
| JP | 47-035050 A | 11/1972 |
| JP | 64-037449 A | 8/1989 |
| JP | H11-503380 A | 3/1999 |
| JP | 2004-300010 A | 10/2004 |
| JP | 2008-542172 A | 11/2008 |

(Continued)

*Primary Examiner* — Galen Hauth
(74) *Attorney, Agent, or Firm* — Nath, Goldberg & Meyer; Joshua B. Goldberg; Sanjana Mangalagiri

(57) ABSTRACT

The present invention relates to a method and device for manufacturing artificial stone. More specifically, the method includes the steps of: (a) mixing two or more kinds of chips having different grain sizes with a raw material for artificial stone; (b) injecting the raw material for artificial stone mixed with the chips into a mold; (c) applying primary vibration using a vibration device such that the raw material is uniformly dispersed in the mold; (d) applying vacuum to eliminate bubbles in the raw material; and (e) molding artificial stone by applying a secondary vibration using the vibration device. According to the method and device for manufacturing artificial stone of the present invention, the deposition rate of chips exposed at a surface of artificial stone is maximized, and thus the external appearance of artificial stone can be more naturally expressed and resistance against abrasion and staining can be improved.

8 Claims, 2 Drawing Sheets

(56) References Cited

FOREIGN PATENT DOCUMENTS

| KR | 10-2000-0045850 | A | 7/2000 |
| KR | 10-0274577 | B1 | 12/2000 |
| KR | 10-2001-0045720 | A | 6/2001 |
| KR | 10-2008-0098973 | A | 11/2008 |
| SU | 1433803 | A1 | 10/1988 |
| WO | 97/27982 | | 8/1997 |
| WO | 20061122893 | A2 | 11/2006 |

* cited by examiner

METHOD AND DEVICE FOR MANUFACTURING ARTIFICIAL STONE

TECHNICAL FIELD

The present invention relates to a method and device for manufacturing artificial stone, and more particularly to a method and device for manufacturing artificial stone, which maximizes a deposition rate of chips exposed to a surface of artificial stone, thereby achieving more natural expression of an external appearance of the artificial stone while improving resistance against abrasion and staining.

BACKGROUND ART

Generally, artificial stone for exterior or interior building materials is produced by mixing various kinds of natural stone chips in a cement base, followed by pressing or simple vibration.

In this case, however, since bubbles are not sufficiently removed from the artificial stone, final products have poor physical properties (strength).

DISCLOSURE

Technical Problem

The present invention is directed to solving such problems of the related art and provides a method and device for manufacturing artificial stone, which maximizes a deposition rate of chips exposed to a surface of artificial stone by mixing two or more kinds of chips in a predetermined ratio and vibrating the mixture in a mold to settle the chips on the bottom of the mold, thereby achieving more natural expression of an external appearance of the artificial stone while improving resistance against abrasion and staining.

Technical Solution

An aspect of the present invention provides a method for manufacturing artificial stone including: (a) mixing two or more kinds of chips having different grain sizes with a raw material for artificial stone; (b) injecting the raw material mixed with the chips into a mold; (c) applying primary vibration to the mold using a vibrator at normal pressure and a vibration rate of 1800 to 7000 revolutions per minute (rpm) for 10 seconds to 1 minute to uniformly disperse the raw material in the mold; (d) evacuating air around the mold for 10 to 30 seconds to create a vacuum of 30 mmHg or more around the mold in order to remove bubbles from the raw material; and (e) applying secondary vibration to the mold using a vibrator at normal pressure and a vibration rate of 1800 to 7000 rpm for 30 seconds to 5 minutes to uniformly disperse the raw material in the mold to mold artificial stone.

Another aspect of the present invention provides a device for manufacturing artificial stone, which includes: a primary vibration unit including a raw material weighing instrument capable of weighing a predetermined amount of a mixed raw material for artificial stone, a mold into which the weighed raw material is injected from the weighing instrument, and a vibrator for primarily vibrating the mold at normal pressure and a vibration rate of 1800 to 7000 rpm for 10 seconds to 1 minute; a vacuum generation unit including a chamber receiving the mold transferred from the primary vibration unit and a vacuum generator capable of evacuating air from the chamber for 10 to 30 seconds to create a vacuum of 30 mmHg or more in the chamber; and a secondary vibration unit including a vibrator for secondarily vibrating the mold transferred from the vacuum generation unit at normal pressure and a vibration rate of 1800 to 7000 rpm for 30 seconds to 5 minutes.

Advantageous Effects

As such, in a method and device for manufacturing artificial stone according to embodiments of the present invention, two or more kinds of chips are mixed in a predetermined ratio and the mixture is vibrated in a mold to settle the chips on the bottom of the mold to maximize a deposition rate of chips exposed to a surface of artificial stone, thereby achieving more natural expression of an external appearance of the artificial stone while improving resistance against abrasion and staining.

BEST MODE

Embodiments of the present invention will now be described in more detail with reference to the accompanying drawings. It should be understood that the accompanying drawings are provided by way of illustration for a more detailed description of the present invention, and do not limit the scope of the invention.

As used herein, the term "artificial stone" includes any cement-based artificial stone or resin-based artificial stone, which can be used as interior building materials or exterior building materials.

Figure 1:
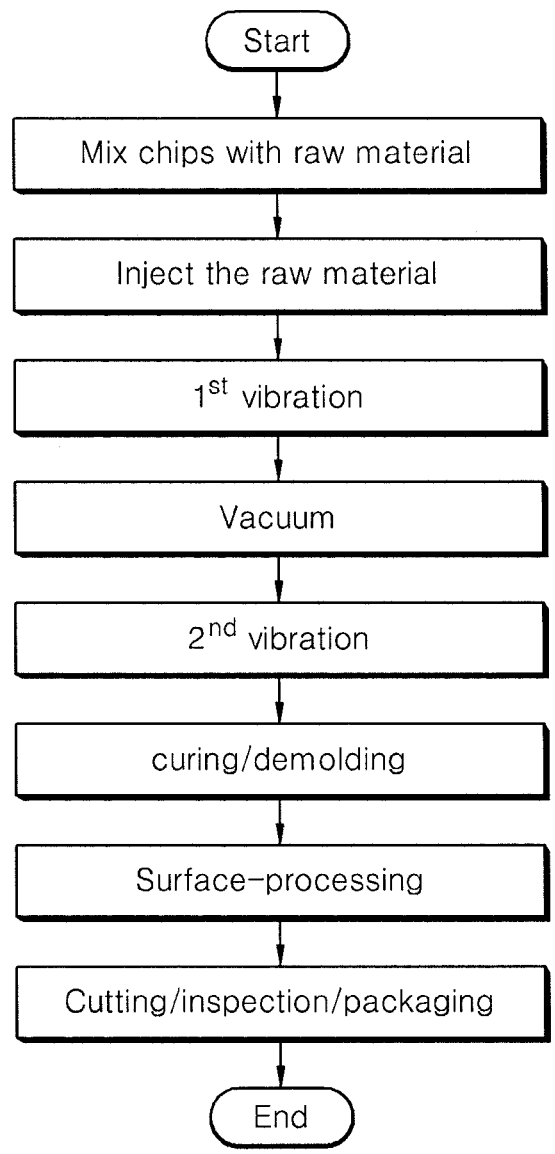
FIG. 1 is a flowchart of a method for manufacturing artificial stone according to one embodiment of the present invention.

FIG. 1 is a flowchart of a method for manufacturing artificial stone according to one embodiment of the present invention.

The method for manufacturing artificial stone according to the embodiment includes: (a) mixing two or more kinds of chips having different grain sizes with a raw material for artificial stone; (b) injecting the raw material mixed with the chips into a mold; and (c) applying primary vibration to the mold using a vibrator at normal pressure and a vibration rate of 1800 to 7000 rpm for 10 seconds to 1 minute to uniformly disperse the raw material in the mold.

Further, the method includes (d) evacuating air around the mold for 10 to 30 seconds to create a vacuum of 30 mmHg or more around the mold in order to remove bubbles from the raw material; and (e) applying secondary vibration to the mold using a vibrator at normal pressure and a vibration rate of 1800 to 7000 rpm for 30 seconds to 5 minutes to uniformly disperse the raw material in the mold to mold artificial stone.

Next, each operation of the method will be described in more detail.

The raw material for artificial stone according to one embodiment may be a resin or a cement slurry.

Here, although any resin used for manufacturing typical artificial stone may be used, the resin according to this embodiment may include at least one selected from the group consisting of, for example, acrylic resins, unsaturated polyester resins, epoxy resins, polyvinyl chloride, polystyrene, polycarbonate, polycarbonate, poly(methyl methacrylate), polyethyleneterephthalate, and styrene-methyl methacrylate copolymers.

Alternatively, the raw material for artificial stone may be a cement slurry, which may include 25 to 35 percent by weight of water based on 100 parts by weight of cement.

If the amount of water in the cement slurry is less than 25 wt %, the cement slurry will undergo deterioration in workability and fluidity, and if the amount of water in the cement slurry exceeds 35 wt %, the final cement product will undergo deterioration in mechanical properties.

The mixing operation (a) may include mixing 125 to 200 parts by weight of chips having a grain size of 3 to 9 mm and 50 to 80 parts by weight of chips having a grain size of 1 to 3 mm based on 100 parts by weight of the raw material.

Here, the raw material for artificial stone may be mixed with two or more kinds of chips having different grain sizes. For example, the chips may include at least one kind of chip selected from the group consisting of resin chips comprising at least one selected from the group consisting of acrylic resins, unsaturated polyester resins, epoxy resins, polyvinyl chloride, polystyrene, polycarbonate, poly(methylmethacrylate), polyethyleneterephthalate, and styrene-methyl methacrylate copolymers; glass chips; colored glass chips; natural stone chips; and colored natural stone chips produced by coloring pulverized natural stone pieces.

In one embodiment wherein the cement slurry is used as the raw material for artificial stone, the cement slurry may be comprised of 170 to 250 parts by weight of natural stone chips having a grain size of 3 to 9 mm, 50 to 100 parts by weight of natural stone chips having a grain size of 1 to 3 mm, 30 to 100 parts by weight of natural stone powder, 25 to 35 parts by weight of water, and 1 to 3 parts by weight of a plasticizer, based on 100 parts by weight of the cement slurry. Here, typical additives known in the art may further be added to the slurry.

Then, the raw material mixed with the chips is injected into a mold and is subjected to primary vibration for 10 seconds to 1 minute to achieve uniform dispersion of the raw material in the mold. If vibration is applied for a period of time less than 10 seconds, it can be difficult to obtain uniform dispersion of the raw material, and if vibration is applied for a period of time exceeding 1 minute, the mixed raw material can be excessively hardened, thereby making it difficult to remove bubbles therefrom.

The raw material for artificial stone mixed with the chips may be spread in a constant thickness within the mold by application of primary vibration, which may be performed at a vibration rate of 1800 to 7000 rpm. If the vibration rate is less than 1800 rpm, it can be difficult to spread the mixed raw material to a uniform thickness within the mold, and if the vibration rate exceeds 7000 rpm, the raw material is likely to escape from the mold during application of primary vibration.

Then, the mold is placed in a typical vacuum chamber, which in turn is evacuated for 10 to 30 seconds to create a vacuum of 30 mmHg or more in the chamber in order to remove bubbles from the raw material.

Then, secondary vibration is applied to the mold using a vibrator for 30 seconds to 5 minutes to mold artificial stone. Here, since chips having a higher specific gravity are settled on the bottom of the mold during application of the secondary vibration, it is possible to increase the amount of chips exposed to a surface of artificial stone, so that the artificial stone produced by the method according to this embodiment has a pleasing external appearance.

Further, in the method for manufacturing artificial stone according to this embodiment, pores formed on the surface of the raw material through which the bubbles are removed from the raw material during the evacuation operation may be filled with the raw material during application of secondary vibration, so that the artificial stone has a dense structure and good mechanical strength.

Finally, the molded artificial stone is sequentially subjected to typical processes, such as curing, releasing and surface grinding, followed by cutting, inspection, and packaging, thereby providing a final product.

Figure 2:
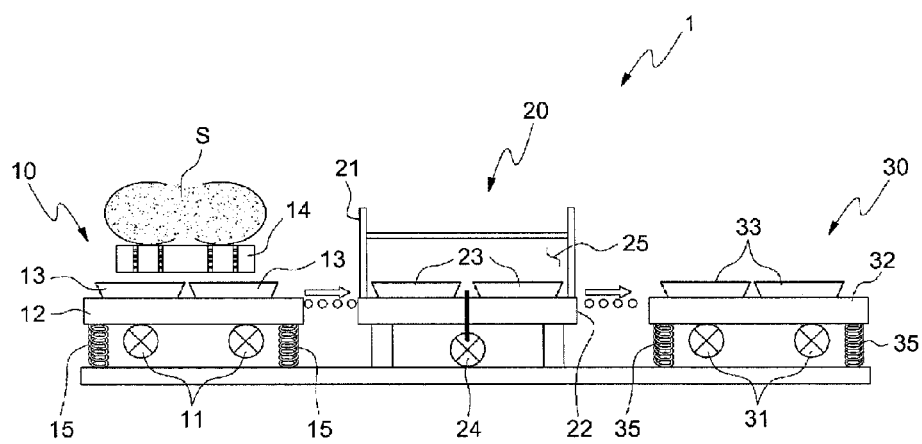
FIG. 2 is a conceptual diagram of a device for manufacturing artificial stone according to one embodiment of the present invention.

FIG. 2 is a conceptual diagram of a device for manufacturing artificial stone according to one embodiment of the present invention.

The device 1 includes a primary vibration unit 10, a vacuum generation unit 20, and a secondary vibration unit 30, and a typical transfer mechanism (for example, a belt conveyer) disposed between the respective units to transfer the mold to the subsequent unit.

The mold is transferred between the respective units and is indicated by different reference numerals 13, 23 and 33 for convenience of description of the mold placed in each of the units.

The primary vibration unit 10 includes a raw material weighing instrument 14 capable of weighing a predetermined amount of a mixed raw material for artificial stone S, a mold 13 into which the weighed raw material S is injected from the weighing instrument 14, and a vibrator 11 for vibrating the mold 13 at normal pressure and a vibration rate of 1800 to 7000 rpm for 10 seconds to 1 minute.

The mold 11 may be supported on a frame 12 or the like during application of vibration, and the frame 12 may be connected to a bottom surface, on which the frame 12 is installed, via an elastic member 15 so as to maintain elasticity upon application of vibration.

The aforementioned operations (a) to (c) of the method may be performed using such a primary vibration unit 10.

The vacuum generation unit 20 includes a chamber 21 which receives the mold 23 transferred from the primary vibration unit 10, and a vacuum generator 24 which is capable of evacuating air from the chamber 21 for 10 to 30 seconds to create a vacuum of 30 mmHg or more in a space 25 of the chamber.

The operation (d) of the method may be performed using such a vacuum generation unit 20.

The secondary vibration unit 30 includes a vibrator 31 for vibrating the mold 33 transferred from the vacuum generation unit 20 at normal pressure and a vibration rate of 1800 to 7000 rpm for 30 seconds to 5 minutes.

Further, the mold 33 may be supported on a frame 32 or the like during application of secondary vibration, and the frame 32 may be connected to a bottom surface, on which the frame 32 is installed, via an elastic member 35 so as to maintain elasticity upon application of vibration.

Each of the units constructed as described above constitutes a single instrument and allows the mold to be transferred therefrom to the next unit after operation corresponding to each unit, thereby enabling continuous operation and mass production.

EXAMPLE

Cement-based artificial stone was produced using natural stone chips.

First, a cement slurry acting as a binder for artificial stone was placed in a mold. Here, the cement slurry was comprised of about 150 parts by weight of natural stone chips having a grain size of about 5 mm, about 100 parts by weight of natural stone chips having a grain size of about 2 mm, about 50 parts by weight of natural stone powder, about 30 parts by weight of water, and about 2 parts by weight of a plasticizer, based on 100 parts by weight of the cement slurry.

Then, the cement slurry was placed in the mold and subjected to primary vibration for about 15 seconds using a vibrator to spread the cement slurry to a constant thickness within the mold, which in turn was placed in a vacuum chamber. Then, the vacuum chamber was evacuated for about 25 seconds to create a vacuum within the chamber in order to remove bubbles from the cement slurry. Then, the mold was subjected to secondary vibration for about 3 minutes using a vibrator to maximize the deposition rate of the chips by settling the natural chips on the bottom of the mold, followed by curing the cement slurry for 12 hours at 40 to 50° C. under constant moisture conditions.

After curing the cement slurry, the cured product was released from the mold and subjected to typical grinding and cutting processes for artificial stone to provide 400 mm(L)× 400 mm(W)×20 mm(T) artificial stone.

Comparative Example

Artificial stone according to the comparative example was produced by the same method as that of the example except that the vacuum generating operation was not performed.

Bending strength and absorption rate of the artificial stone products according to the example and the comparative example were measured, and results are shown in Table 1.

TABLE 1

|  | Example | Comparative Example |
| --- | --- | --- |
| Bending strength (N/mm$^2$) | 13.5 | 11.2 |
| Absorption rate (%) | 1.5 | 2.5 |

As can be seen from Table 1, the artificial stone according to the example has high bending strength and a low absorption rate.

Although some embodiments have been described with reference to the accompanying drawings, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A method for manufacturing artificial stone, comprising:
   (a) mixing two or more kinds of chips having different grain sizes with a raw material for artificial stone;
   (b) injecting the raw material mixed with the chips into a mold;
   (c) applying primary vibration to the mold using a vibrator at a normal pressure to uniformly disperse the raw material in the mould between 10 seconds and 1 minute;
   (d) evacuating air around the mold to create a vacuum around the mold in order to remove bubbles from the raw material; and
   (e) applying secondary vibration to the mold using a second vibrator at a normal pressure to mold artificial stone between 30 seconds and 5 minutes.

2. The method of claim 1, wherein the raw material is a resin or a cement slurry.

3. The method of claim 2, wherein the resin comprises at least one selected from the group consisting of acrylic resins, unsaturated polyester resins, epoxy resins, polyvinyl chloride, polystyrene, polycarbonate, poly(methyl methacrylate), polyethyleneterephthalate, and styrene-methyl methacrylate copolymers.

4. The method of claim 2, wherein the cement slurry contains 25 to 35 parts by weight of water based on 100 parts by weight of cement.

5. The method of claim 1, wherein the mixing of two or more kinds of chips comprises mixing 125 to 200 parts by weight of chips having a grain size of 3 to 9 mm and 50 to 80 parts by weight of chips having a grain size of 1 to 3 mm based on 100 parts by weight of the raw material for artificial stone.

6. The method of claim 1, wherein the chips comprise at least one kind of chip selected from the group consisting of resin chips, glass chips, colored glass chips, natural stone chips, and colored natural stone chips produced by coloring pulverized natural stone pieces.

7. The method of claim 1, wherein the primary vibration and the secondary vibration are applied at normal pressure and a vibration rate of 1800 to 7000 rpm.

8. The method of claim 1, wherein the evacuation is performed to create a vacuum of 30 mmHg or more.

* * * * *